United States Patent [19]

Permut et al.

[11] Patent Number: 4,550,884
[45] Date of Patent: Nov. 5, 1985

[54] TAPE DRIVE HAVING SWING ARM BUFFERS AND AUTOMATIC THREADING

[75] Inventors: Ronald Permut; Robert Cope; James Apple; August P. Epina; Frederick G. Munro, all of Boulder County, Colo.

[73] Assignee: Storage Technology Corporation, Louisville, Colo.

[21] Appl. No.: 554,428

[22] Filed: Nov. 22, 1983

[51] Int. Cl.⁴ .................. G11B 15/66; G11B 15/32; B65H 59/38
[52] U.S. Cl. ..................................... 242/189; 226/91
[58] Field of Search ............. 242/182, 183, 184, 185, 242/189, 186, 190; 226/95, 97, 91

[56] References Cited

U.S. PATENT DOCUMENTS

| | | |
|---|---|---|
| 3,426,976 | 2/1969 | Maxey ............................ 242/189 |
| 3,544,037 | 12/1970 | Arent ............................. 242/189 |
| 3,697,016 | 10/1972 | Leifer et al. ................... 242/189 |
| 4,063,139 | 12/1977 | Miller ......................... 242/184 X |
| 4,243,186 | 1/1981 | Peter et al. .................... 242/195 |
| 4,331,306 | 5/1982 | Epina et al. .................... 242/182 |

Primary Examiner—Philip R. Coe
Assistant Examiner—Scott J. Haugland
Attorney, Agent, or Firm—Woodcock Washburn Kurtz Mackiewicz & Norris

[57] ABSTRACT

A magnetic tape drive has swing arm tensioning devices with two rollers. During normal operation, the tape passes between the two swing arm rollers and a fixed roller. During automatic threading, a pneumatic trough formed by the base casting and an opening in the bottom of the base casting transports tape for threading.

4 Claims, 8 Drawing Figures

TAPE DRIVE HAVING SWING ARM BUFFERS AND AUTOMATIC THREADING

BACKGROUND OF THE INVENTION

The present invention relates to magnetic tape drives for the storage of digital data and more particularly, to a high speed buffered tape drive having conventional sized reels which can be mounted in a standard rack configuration.

Magnetic tape units for storing digital data typically accelerate tape from a stop to a high speed very rapidly on demand of a processing unit. In order to achieve this, the main mass of the tape must be decoupled from the tape in the immediate vicinity of the capstan and the read/write head.

Typically, vacuum columns have been used to decouple the inertia of tape on the machine and file reels from the capstan. U.S. Pat. No. 4,331,306—Epina, et al shows a magnetic tape drive with vacuum column decoupling which can be mounted in a standard rack configuration.

While vacuum columns are suitable for tape drives in many applications, there are other applications, particularly for small rack-mounted tape drives, in which vacuum columns have significant disadvantages.

Swing arms, or tension arms, have previously been used instead of vacuum columns for buffering the tape drive capstan from the inertia of tape on the reels. U.S. Pat. No. 4,243,186—Peter et al is an example. This patent discloses a tape drive with a single swing arm and a pneumatic path for automatically threading the tape past the swing arm. Automatic threading is relatively straightforward in such a tape drive, but accomplishing automatic threading in a tape drive with two decoupling swing arms, one for each reel, is much more difficult.

It is an object of the present invention to provide a compact digital magnetic tape drive using swing arms to decouple the tape to obtain the advantages of reduced cost and reduced noise when compared to vacuum column buffered tape drives.

It is another object of the present invention to provide automatic threading in a magnetic tape drive in which two swing arms decouple the inertia of the tape on the reels from the capstan and in which tape is tensioned during running by swing arms having two rollers which trap the tape against a fixed roller.

RELATED APPLICATIONS

"TAPE DRIVE HAVING SWING ARM BUFFERS AND AUTOMATIC THREADING", Permut, Ser. No 553,481, filed Nov. 18, 1983, discloses and claims certain features of a tape drive in which the present invention is embodied.

SUMMARY OF THE INVENTION

In accordance with the present invention, a magnetic tape drive has a base casting with a pneumatic trough extending from an opening in the bottom of the base casting to the machine reel hub to which vacuum is applied to draw air through the trough to thread the tape. The base casting encloses the trough on three sides and the fourth side is closed by a flat clear plastic cover which closes the trough. The pneumatic trough provided in accordance with the present invention has the advantage over prior art pneumatic threading systems in that turbulence in the vicinity of the file reel is avoided and good pickup and transport of the tape leader through the pneumatic trough is provided.

Further in accordance with the invention, the channel in the base casting which forms the pneumatic trough is closed on the fourth side by a clear plastic cover. The reel inertia is buffered from the capstan by swing arms having rollers which extend through slots in the base casting. In accordance with the invention, the swing arms are retracted for threading and the rollers engage a sliding seal which closes the top of the slots to provide a good pneumatic path. Further in accordance with the invention, the slots and the opening through which the capstan shaft extends, open into a closed cavity in the back of the tape drive. Further in accordance with the invention, the speed of the reel motors is changed from a slow speed during the initial phase of threading to a faster speed when the tape reaches the machine reel. After the tape has been threaded through its leader to the beginning of tape marker, the reel motors are turned off, the vacuum blower for threading is turned off, and the retraction of the swing arms is disabled.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

The magnetic tape drive of the present invention includes a file reel hub assembly 11 and a machine reel 12. Magnetic tape is driven between these reels past a magnetic read/write head 13 by a capstan 14.

Figure 5:
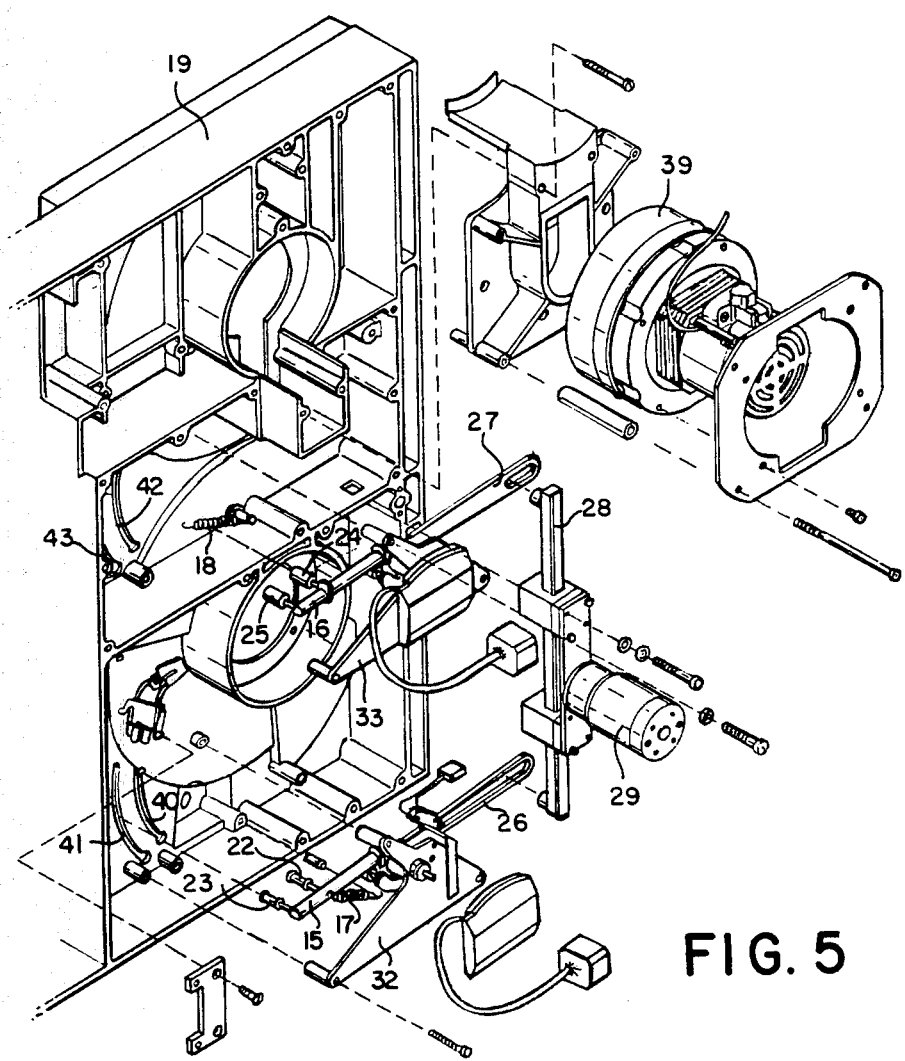
Figure 6:
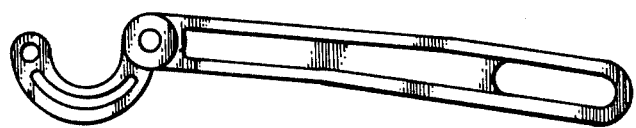
FIG. 6 is a view of the retractor arm.

A first pivoted swing arm 15 (FIG. 5) is positioned between the file reel and capstan 14. A second swing arm 16 is positioned between the machine reel 12 and the capstan 14. The swing arms are biased away from the reels by springs 17 and 18. The foregoing components are mounted on a base casting 19.

Fixed roller 20 is positioned adjacent the swing arm 15 and fixed rollers 21a and 21b are positioned adjacent swing arm 16. Swing arm 15 has a pair of rollers 22 and 23. Swing arm 16 has a pair of rollers 24 and 25. When the tape drive is in its operating condition, the tape passes between one of the fixed rollers and the pair of rollers on the adjacent swing arm so that the bias on the swing arm decouples the inertia of the tape on the file and machine reels from the capstan. This provides an advantageous tape path with good decoupling of the tape from the intertia of the tape on the file and machine reels.

However, the tape path is a complicated one insofar as automatic threading is concerned. Automatic threading is accomplished by retracting the swing arms toward the file and machine reels and out of the tape path during threading. The swing arms are retracted by retractor arms 26 and 27. Swing arm 15 is pivoted on spider plate 32 and swing arm 16 is pivoted on spider plate 33. Spring 17 connects swing arm 15 with base casting 19 to bias it and spring 18 provides the bias for swing arm 16. Spider plates 32 and 33 are mounted on the base casting. A connecting rod 28 connects the retractor arms 26 and 27 to a retractor motor 29.

Figure 1:
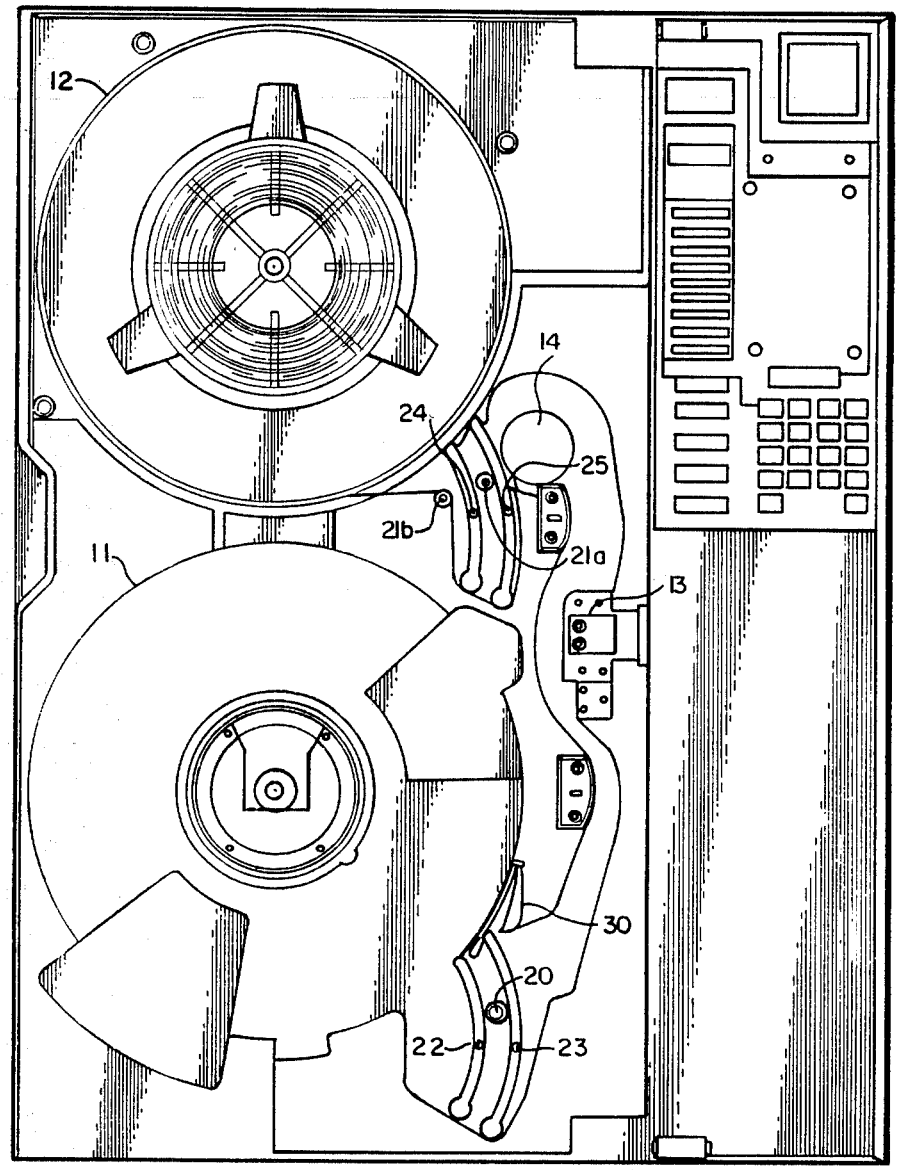
FIG. 1 shows the front of the tape drive.
Figure 2:
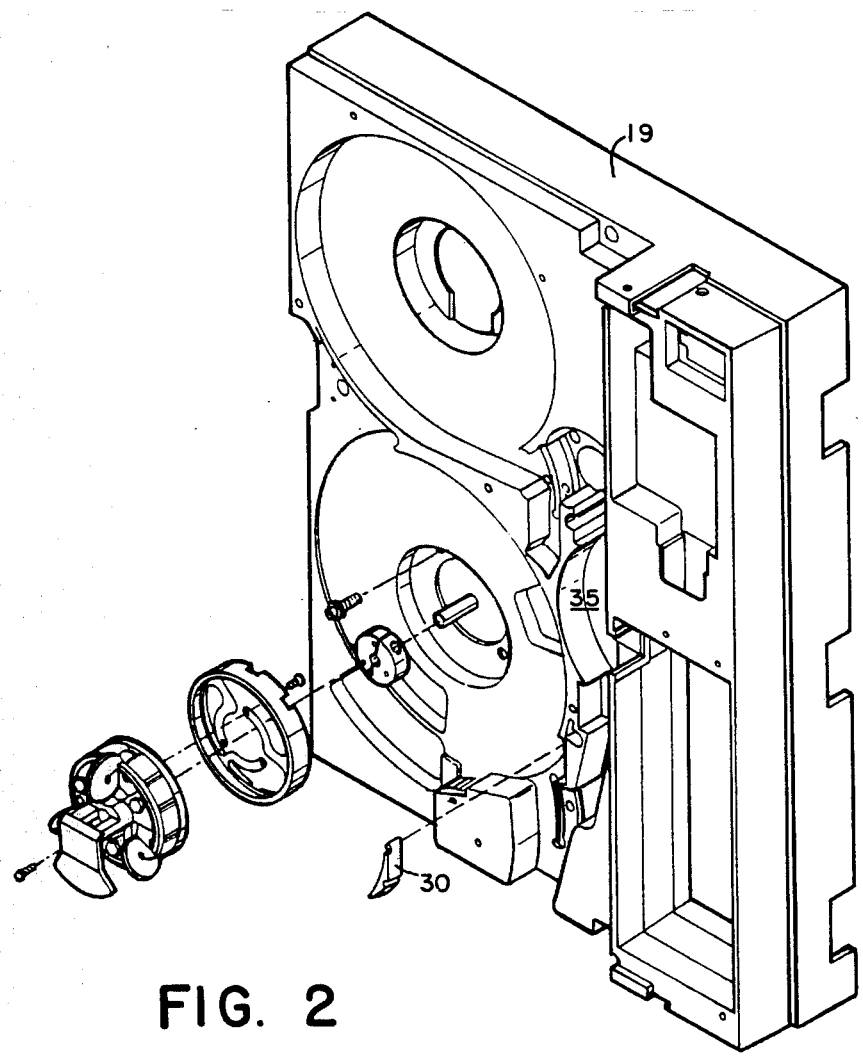
FIGS. 2 and 3 are front views of the base casting with certain components shown exploded.

In order to complete the threading path, a deflector 30 (FIGS. 1 and 2) is positioned between the retracted movable rollers 22 and 23. If the deflector 30 is not properly positioned, the tape from file reel 11 will pass between the rollers 22 and 23 resulting in an improper threading. The deflector 30 is biased away from the file reel by a spring during normal operation. During threading, as swing arm 15 is retracted, roller 23 bears against deflector 30 to move it to a position in which it spans the rollers 22 and 23.

Figure 3:
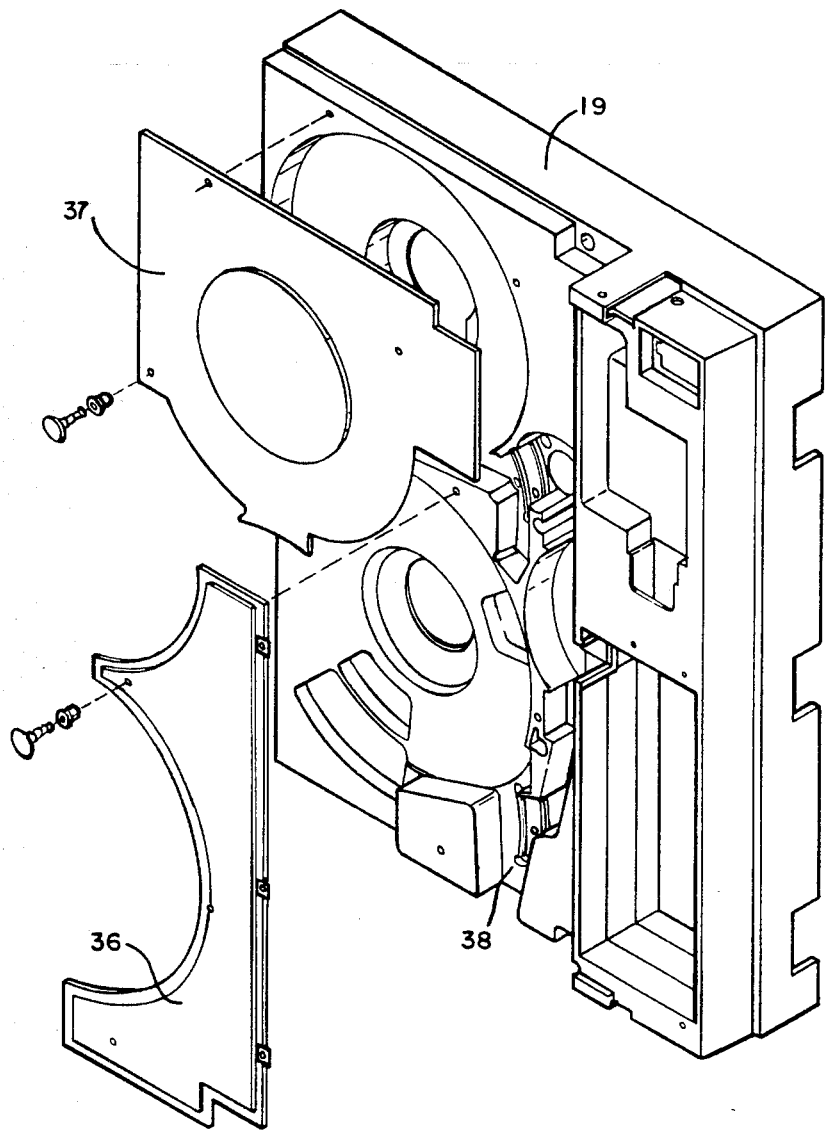

In accordance with the present invention, base casting 19 forms a channel 35 (FIG. 2) which encloses the tape path on three sides. A cover, including clear plastic threading cover 36 and a machine reel cover 37 (FIG. 3) are positioned to seal the open side of the channel to form the pneumatic trough. An opening 38 in the bottom of the base casting is below the pneumatic trough. Air flows through opening 38 to engage tape from the file reel and to thread it past the read/write head and the capstan to the machine reel. By providing an opening in the bottom of the base casting directly in the vertically oriented tape path, a smooth flow of air though the channel, without turbulence around the file reel, is achieved. This results in a good, repeatable threading operation. A blower motor 39 (FIG. 5) applies vacuum to the perforated hub of the machine reel. This draws air through the channel 35 during threading.

Figure 4:
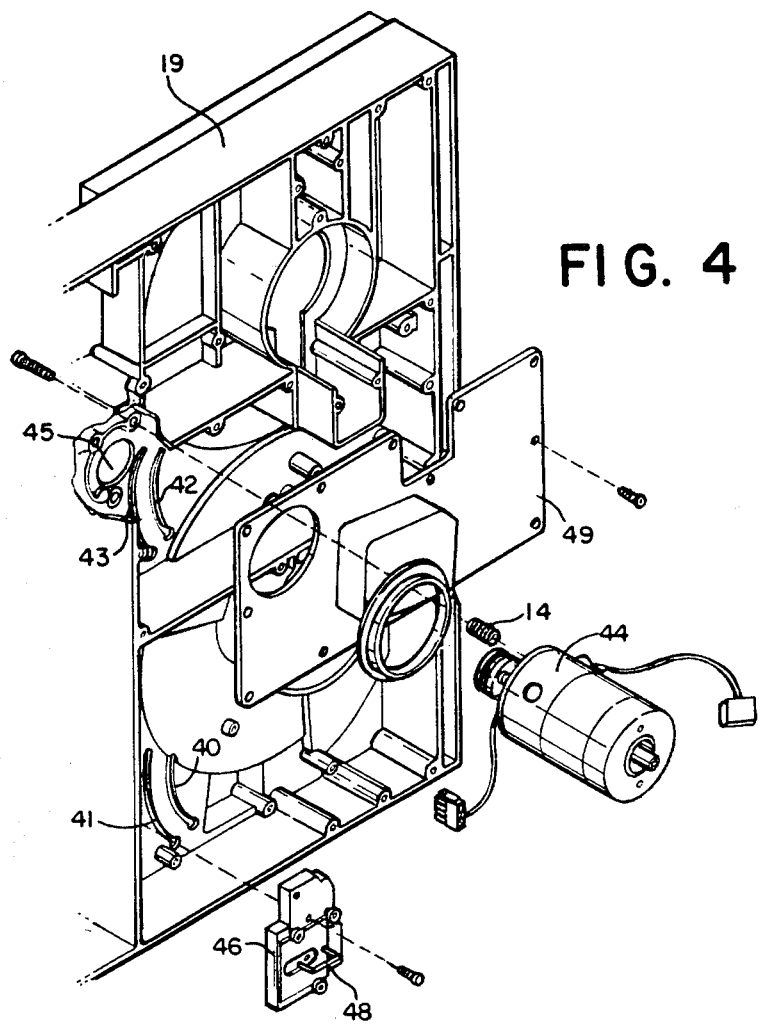
FIGS. 4 and 5 are views of the back of the base casting with certain components shown exploded.
Figure 7:
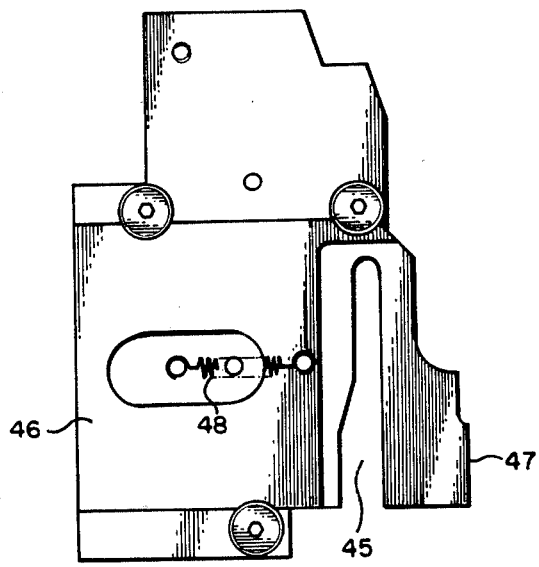
FIG. 7 shows the sliding seal.
Figure 8:
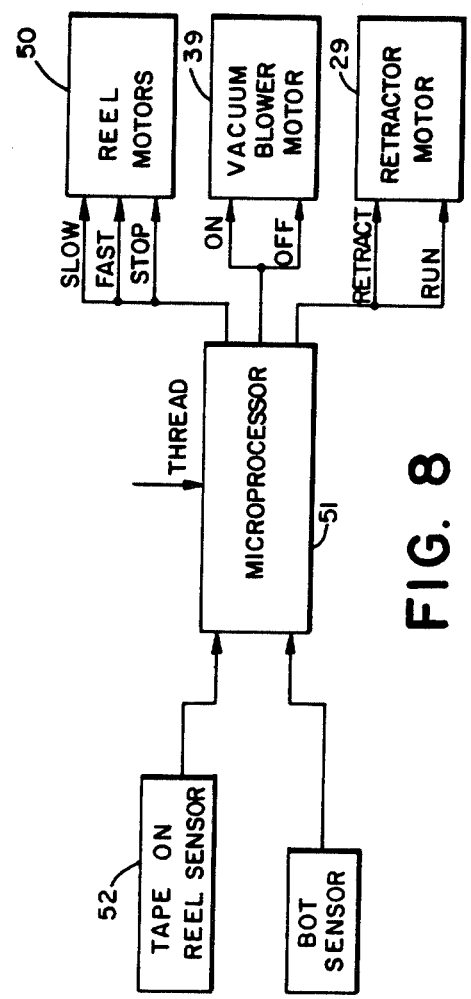
FIG. 8 is an electrical block diagram of the blower and reel motor controls.

The rollers 22 and 23 on swing arm 15 extend through slots 40 and 41 in the base casting. Similarly, the rollers 24 and 25 on swing arm 16 extend through slots 42 and 43 in the base casting. The capstan motor 44 (FIG. 4) has a shaft which extends through an opening 45 in the base casting. These openings must be at least partially sealed during threading to provide a closed pneumatic path for threading the tape. In order to close the upper portion of the slots 40 and 41 during threading, a slider assembly 46 is provided. The sliding seal 47 in this assembly is shown in more detail in FIG. 7. The sliding seal 47 slides within assembly 46 against the bias provided by spring 48. As swing arm 16 rotates to retract, the shaft on which roller 24 is mounted moves upwardly in the slot 45 in sliding seal 47. The roller shaft engages the shoulder on the slot to slide the sliding seal 47, thereby moving its top toward the right to cover the top portion of slots 40 and 41. This seals these slots in a critical area so that a good pneumatic trough is created.

The slots 42 and 43 and the capstan shaft opening 45 are also sealed. These openings are in a sealed cavity on the back of the base casting. A plate 49 (FIG. 4) encloses this sealed cavity in the base casting. This also ensures integrity of the pneumatic trough.

While a particular embodiment of the invention has been shown and described, various modifications are within the true spirit and scope of the invention. The appended claims are, therefore, intended to cover all such modifications.

What is claimed is:

1. A magnetic tape drive of the type in which magnetic tape is driven past a magnetic read/write head between a machine reel and a file reel by a capstan comprising:

a base casting;

hubs for said machine and file reels mounted on said base casting one above the other;

buffers mounted on said base casting between said reels and said capstan for decoupling the inertia of tape on said reels from said capstan, said read/write head, capstan, and buffers defining a substantially vertical tape path beside said file and machine reels and between them;

a pneumatic trough formed by said base casting, said trough extending from said file reel to said machine reel and following said tape path;

a vacuum motor applying a vacuum to the hub of said machine reel and drawing air through said trough during threading;

an opening in the bottom of said base casting below said trough and said tape path so that air flows through said opening to engage tape from said file reel to thread it past said read/write head and said capstan to said machine reel;

said buffers including a swing arm biased away from said file reel and having a roller engaging said tape in said tape path to decouple the inertia of tape on said file reel from said capstan, said swing arm being pivoted at the rear of said base casting, said roller extending through a slot in said base casting to engage said tape;

means for retracting said swing arm to a position in which said roller is out of said tape path during threading; and a sliding seal moved by said swing arm when it is retracted to move said seal to close said slot during threading.

2. The tape drive recited in claim 1 wherein said sliding seal is a flap member movably mounted on said base casting at a position adjacent said slot and engaged by the roller on said swing arm to move it to a position covering said slot when said swing arm is retracted.

3. The tape drive recited in claim 1 wherein said base casting has a channel which encloses said tape path on three sides; and a cover positioned on said base plate to seal the open side of said channel to form said trough.

4. The tape drive recited in claim 3 wherein said buffers are mounted in said channel in a slot extending through said casting and wherein said capstan has a shaft which is mounted in an opening in said channel; and a sealed cavity on the opposite side of said base casting from said reels, capstan and read/write head, said slots and opening for said capstan shaft extending into said cavity.

* * * * *